(12) United States Patent
Kim et al.

(10) Patent No.: US 6,275,346 B1
(45) Date of Patent: Aug. 14, 2001

(54) TECHNIQUE OF OPTIMIZING READ/WRITE CHANNEL PARAMETERS

(75) Inventors: Gyu-Taek Kim, Seoul; Jong-Yun Yun, Taegukwangyok-shi, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/253,061

(22) Filed: Feb. 19, 1999

(30) Foreign Application Priority Data

Feb. 21, 1998 (KR) .................................................... 98-5516

(51) Int. Cl.[7] .................................................. G11B 27/36
(52) U.S. Cl. ................................. 360/31; 360/46; 360/68
(58) Field of Search .................................. 360/31, 46, 65, 360/68, 67, 53, 48; 324/212, 226; 714/704, 769, 770, 774

(56) References Cited

U.S. PATENT DOCUMENTS

| | | |
|---|---|---|
| 4,821,125 | 4/1989 | Christensen et al. . |
| 5,107,378 | 4/1992 | Cronch et al. . |
| 5,121,260 | 6/1992 | Asakawa et al. . |
| 5,121,262 | 6/1992 | Squires et al. . |
| 5,258,876 | 11/1993 | Danner et al. . |
| 5,262,907 | 11/1993 | Duffy et al. . |
| 5,408,367 | 4/1995 | Emo . |
| 5,430,581 | 7/1995 | Moribe et al. . |
| 5,537,264 | 7/1996 | Pinteric . |
| 5,600,500 | 2/1997 | Madsen et al. . |
| 5,610,776 | 3/1997 | Oh . |
| 5,657,176 | 8/1997 | Moribe et al. . |
| 5,687,036 | 11/1997 | Kassab . |
| 5,726,821 | 3/1998 | Cloke et al. . |
| 5,771,131 | 6/1998 | Pirzadeh . |
| 5,774,285 | 6/1998 | Kassab et al. . |
| 5,831,782 | 11/1998 | Kohno et al. . |
| 5,995,305 * | 11/1999 | McNeil et al. ................. 360/31 |
| 6,069,758 * | 5/2000 | Chung ............................ 360/31 |
| 6,118,614 * | 9/2000 | Lee ................................. 360/53 |

* cited by examiner

Primary Examiner—Alan T. Faber
(74) Attorney, Agent, or Firm—Robert E. Bushnell, Esq.

(57) ABSTRACT

A read/write channel parameter optimization technique in a hard disk drive having a read/write channel circuit reduces an error rate during a data read/write operation through optimization of read and write channel parameters, write channel parameters are optimized by searching for the optimized level of each write channel parameter in accordance with characteristics of all head/zone combinations from data write and read operations of the same number while varying levels of the write channel parameter. In read channel parameter optimization, an optimized read channel parameter combination is searched for by suppressing noise through data write and read operations of the same number on varied read channel parameter combinations.

22 Claims, 8 Drawing Sheets

|  | RUN1 | RUN2 | RUN3 | RUN4 | RUN5 | RUN6 |
|---|---|---|---|---|---|---|
| Exp01 | 0028 | 0492 | 0019 | 0010 | 0030 | 0035 |
| Exp02 | 0008 | 0217 | 0011 | 0003 | 0007 | 0013 |
| Exp03 | 0004 | 0112 | 0001 | 0001 | 0003 | 0010 |
| Exp04 | 0001 | 0046 | 0000 | 0002 | 0000 | 0008 |
| Exp05 | 0002 | 0039 | 0000 | 0001 | 0000 | 0007 |
| Exp06 | 0004 | 0190 | 0006 | 0001 | 0001 | 0009 |
| Exp07 | 0000 | 0093 | 0003 | 0000 | 0001 | 0006 |
| Exp08 | 0000 | 0054 | 0001 | 0000 | 0002 | 0007 |
| Exp09 | 0001 | 0042 | 0004 | 0001 | 0000 | 0005 |
| Exp10 | 0019 | 0484 | 0021 | 0002 | 0033 | 0030 |
| Exp11 | 0001 | 0086 | 0002 | 0002 | 0004 | 0000 |
| Exp12 | 0000 | 0058 | 0000 | 0003 | 0001 | 0006 |
| Exp13 | 0000 | 0030 | 0004 | 0002 | 0000 | 0005 |
| Exp14 | 0017 | 0425 | 0016 | 0004 | 0016 | 0012 |
| Exp15 | 0004 | 0193 | 0009 | 0002 | 0006 | 0008 |
| Exp16 | 0000 | 0041 | 0002 | 0001 | 0000 | 0003 |
| Exp17 | 0002 | 0024 | 0002 | 0004 | 0004 | 0004 |
| Exp18 | 0012 | 0353 | 0013 | 0002 | 0011 | 0012 |
| Exp19 | 0005 | 0181 | 0003 | 0001 | 0001 | 0013 |
| Exp20 | 0003 | 0107 | 0006 | 0001 | 0000 | 0012 |
| Exp21 | 0000 | 0035 | 0006 | 0006 | 0003 | 0014 |
| Exp22 | 0019 | 0387 | 0013 | 0003 | 0019 | 0021 |
| Exp23 | 0004 | 0150 | 0001 | 0003 | 0006 | 0012 |
| Exp24 | 0009 | 0087 | 0001 | 0003 | 0002 | 0006 |
| Exp25 | 0003 | 0063 | 0002 | 0004 | 0001 | 0008 |

FIG. 1 *(Prior Art)*

TECHNIQUE OF OPTIMIZING READ/WRITE CHANNEL PARAMETERS

CLAIM OF PRIORITY

This application makes reference to, incorporates the same herein, and claims all benefits ruing under 35 U.S.C. § 119 from an application for METHOD OF OPTIMIZING READ/WRITE CHANNEL PARAMETER earlier filed in the Korean Industrial Property Office on Feb. 21, 1998 and there duly assigned Ser. No. 551611998.

BACKGROUND OF THE INVENTION

1. Field of the Invention

The present invention relates to the optimization of read/write channel parameters in a magnetic disk recording device such as a hard disk drive, and in particular, to techniques for optimizing write channel parameters as well as read channel parameters in accordance with head/zone combination characteristics.

2. Description of the Related Art

A read/write channel encodes write data received from a host computer and outputs the encoded write data to a head, prior to writing the data on a disk. It also decodes data read from the disk and transmits the read data to the host computer. Thus, the read/write channel circuit is a significant factor in determining the data read/write performance. In general, interpretation of an analog signal retrieved from a disk or writing specific data on the disk varies with channel parameter settings for the read/write channel circuit. That is, an error rate during a data read/write operation changes depending on channel parameters.

In this context, a hard disk drive manufacturer determined read/write channel parameters from experiments on several drive samples and applies the determined parameters commonly to all drives. The differences of characteristics of each drive brought about a large difference between the error rates of drives and high error rates, so as to lower the data reproduction capability of a drive. To circumvent this problem, many read channel parameter optimization techniques have been explored. Read channel parameters include the cut-off frequency, filter boost, threshold voltage, and window shift of a read/write channel circuit for use in processing a read signal during reading data. Read channel optimization is a channel parameter estimation procedure in which a specific pattern is written in a channel optimization position of a disk, the pattern is iteratively read, while varying combinations of channel parameters to be optimized, and a total number of errors is calculated during a read operation.

However, the optimization confined to read channel parameters has limits in maximizing drive performance because a specific pattern cannot reliably be written by a head on a channel optimization position of a disk with non-optimized write channel parameters. Hence, write channel parameter optimization should precede read channel parameter optimization.

Further, if head noise and external stresses cause non-repeatable runout, the above read channel parameter optimization method results in a high error rate for a predetermined time period.

In conclusion, the above read channel parameter optimization method cannot optimize read channel combinations due to its distinctive shortcomings of noise generated from the disparity in number between data writes and data reads, the resulting increase of errors, and thus cannot accurately estimate an error rate.

The following patents each discloses features in common with the present invention but do hot teach or suggest the specifically recited technique for optimizing read/write channel parameters of the present invention: U.S. Pat. No. 5,831,782 to Kohno et al., entitled Method And Apparatus For Supplying Optimal Bias Current To A Magnetic Head, U.S. Pat. No. 5,726,821 to Cloke et al., entitled Programmable Preamplifier Unit With Serial Interface For Disk Data Storage Device Using MR Heads, U.S. Pat. No. 4,821,125 to Christensen et al., entitled Compensation Of Write Current And Delta-V For Recording Component And Radial Position, U.S. Pat. No. 5,121,262 to Squires et al., entitled Disk drive System Employing adaptive Read/Write Channel Controls And Method Of Using Same, U.S. Pat. No. 5,408,367 to Emo, entitled Method Of Optimizing Operation Of disk Drive, U.S. Pat. No. 5,258,876 to Danner et al., entitled Zone Bit Recording With Write Compensation, U.S. Pat. No. 5,537,264 to Pinteric, entitled Method For Optimally Selecting Media Transfer Rates For Different Data Heads Based On Individual Data Head Performance, U.S. Pat. No. 5,430,581 to Moribe et al., entitled Method And Apparatus For Optimizing The Recording and Reproducing Of Information From Magnetic Disks, U.S. Pat. No. 5,657,176 to Moribe et al., entitled Method And Apparatus For Optimizing The Recording And Reproducing Of information From Magnetic Disks, U.S. Pat. No. 5,771,131 to Pirzadeh, entitled Tracking In Hard Disk Drive Using Magnetoresistive Heads, U.S. Pat. No. 5,107,378 to Cronch et al., entitled Adaptive Magnetic Recording And Readback System, U.S. Pat. No. 5,262,907 to Duffy et al., entitled Hard Disc Drive With Improved Servo System, U.S. Pat. No. 5,121,260 to Asakawa et al., entitled Read Channel Optimization System, U.S. Pat. No. 5,610,776 to Oh, entitled Method Of optimizing Read Channel Of disk Drive Recording Apparatus By Using Error Rate, U.S. Pat. No. 5,600,500 to Madsen et al., entitled Performance Based Write Current Optimization Process, U.S. Pat. No. 5,687,036 to Kassab, entitled Selection Of Optimum Write Current In A Disc Drive To Minimize The Occurrence Of Repeatable Read Errors, and U.S. Pat. No. 5,774,285 to Kassab et al., entitled Selection Of optimal Read/Write Channel Parameters In A Hard Disc Drive.

SUMMARY OF THE INVENTION

An object of the present invention is to provide a write channel parameter optimization technique in a hard disk drive having a read/write channel circuit, which can decrease a data read/write error rate through optimization of write channel parameters to thereby increase drive performance.

Another object of the present invention is to provide a read channel parameter optimization technique in a hard disk drive having a read/write channel circuit, which removes noise involved in read channel parameter optimization to enable an accurate error rate estimation.

A further object of the present invention is to provide a read/write channel parameter optimization technique in a hard disk drive having a read/write channel circuit, which separately optimizes write and read channel parameters to thereby increase drive performance and reliability.

To achieve the above objects, there is provided a read/write channel parameter optimization technique in a hard disk drive having a read/write channel circuit. In the read/write channel parameter optimization technique, a track is designated as a test track in each of a plurality of head/zone combinations. An optimum level of each write channel parameter is searched for by performing data pattern write/read operations on the designated test track, and recording one of the default and optimum levels of the write channel parameter as an optimized write channel parameter value for a selected head/zone combination. Finally, an optimum combination of read channel parameters is searched for by calculating the error number for each read channel parameter combination from data pattern write and read operations of the same number on the designated test, and recording one of the searched optimum read channel parameter combination and a default read channel parameter combination as an optimized read channel parameter combination for the selected head/zone combination.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is an exemplary table of measured error rates in a conventional read channel parameter optimization method;

DETAILED DESCRIPTION OF THE PREFERRED EMBODIMENTS

Figure 2:
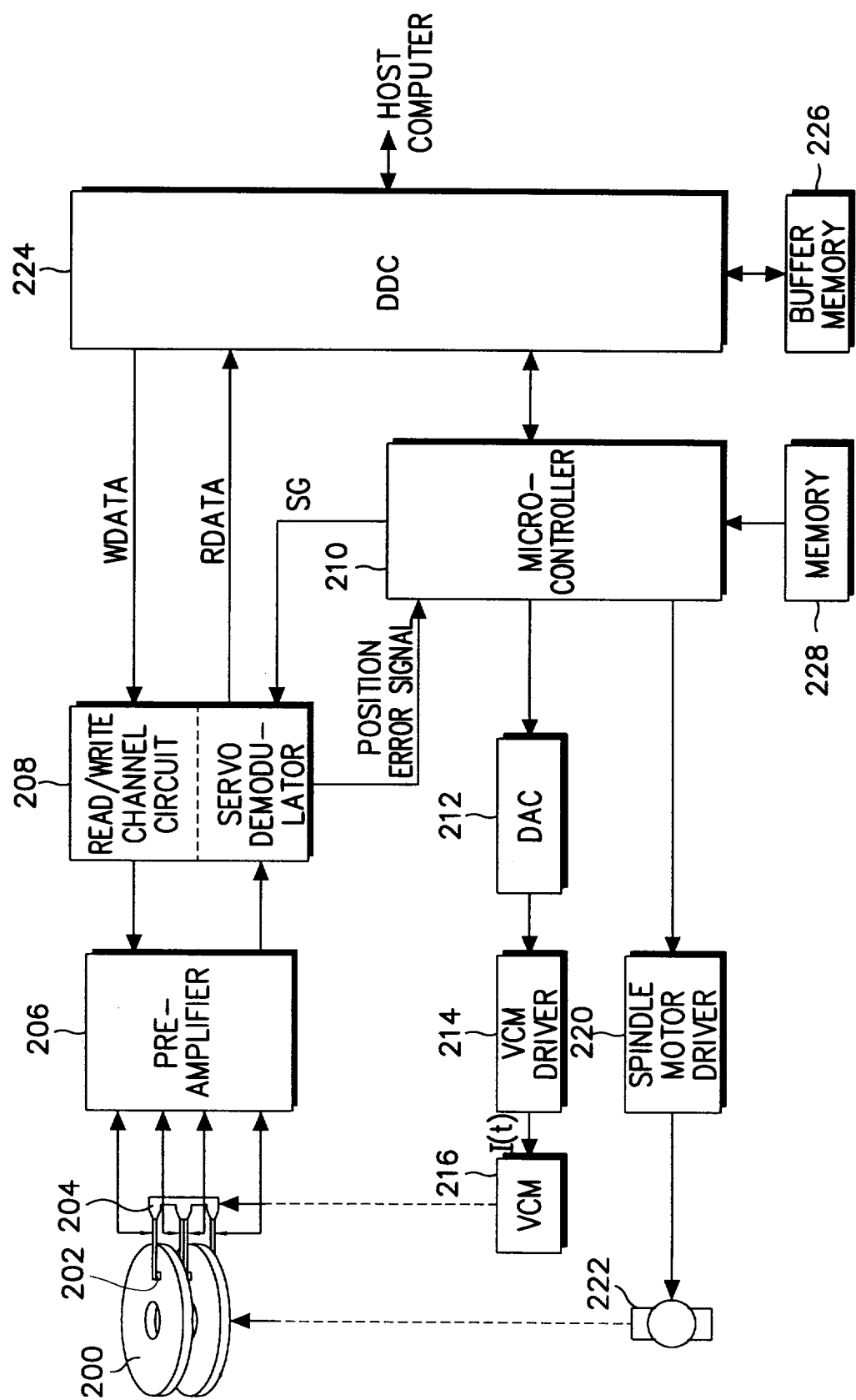
FIG. 2 is a block diagram of a hard disk drive according to the present invention.

FIG. 1 is an exemplary table of measured error rates in the conventional read channel parameter optimization method. In FIG. 1, reference characters Exp01 to Exp25 in the first column indicate 25 combinations of read channel parameters (hereinafter, referred to as read channel combinations), and reference characters RUN1 to RUN6 in the first row indicate that an experiment was repeated six times on a single read channel combination. It is noted from the table that if a data pattern is written one more time in a channel optimization position in RUN 1, an error rate in RUN2 is higher than that in any other numbered RUN. This is because noise generated during writing the specific data pattern impedes a normal data read.

FIG. 2 is a block diagram of a hard disk drive having two disks 200 and four heads 202 according to the present invention. Referring to FIG. 2, the disks 200 are stacked around a shaft of a spindle motor 222, with each disk surface corresponding to one head 202. Each disk 200 is divided into a plurality of zones and each zone includes a plurality of concentrically arranged tracks. The disk surface includes a parking zone where the head 202 is positioned when the drive is inoperative and a maintenance area for recording information on defect sectors and system maintenance and repair. The heads 202 are fixed to arms 204 extending from an arm assembly of a rotary voice coil motor (VCM) 216, for horizontally flying over the disks 200 according to the level and direction of a current applied to the VCM 216.

A preamplifier 206 preamplifies a read signal picked up by a head 202 during a data read, and causes a selected head 202 to write encoded write data received from the read/write channel circuit 208 on a disk surface during a data write. The read/write channel circuit 208 decodes the read signal received from the preamplifier 206 and outputs serial read data RDATA and a clock signal to a disk data controller (DDC) 224. The read/write channel circuit 208 encodes write data WDATA received from the DDC 224 and supplies the encoded write data to the preamplifier 206. The read/write channel circuit 208 is provided with a servo demodulator for demodulating servo information (e.g., a position error signal of a head) from the read signal received from the preamplifier 206 and outputting the demodulated servo information to a microcontroller 210. The DDC 224 controls a data path between a host computer and the disks 200 and interfaces communications between the host computer and the microcontroller 210.

The microcontroller 210 controls the overall operation of the drive on the basis of a control program stored in a memory 228. For example, the microcontroller 210 receives the position error signal from the servo demodulator of the read/write channel circuit 208 in a digital form via an analog-to-digital converter (ADC) of the microcontroller 210 and performs an on-track control on the selected head 202. It also controls the DDC 224 in response to a data read/write command received from the host computer and implements a servo control on the heads 202 and the spindle motor 222. The microcontroller 210 generates signals necessary for servo control and data read/write, such as a servo gate signal and a data write enable signal, upon receipt of the demodulated servo information from the servo demodulator and outputs the signals to the read/write channel circuit 208 and the DDC 224.

A digital-to-analog converter (DAC) 212 converts a digital control input value for controlling positions of the heads 202 received from the microcontroller 210 to an analog signal. A VCM driver 214 generates a current I(t) for driving an actuator by means of the analog signal received from the DAC 212. The VCM 216, positioned on one side of the actuator having the heads 202 fixed on the other side thereof, horizontally moves the heads 202 over the disks 200 in accordance with the direction and level of the current I(t) received from the VCM driver 214. A spindle motor driver 220 outputs a spindle motor driving signal corresponding to the control value received from the microcontroller 210 to drive the spindle motor 222. A buffer memory 226 is controlled by a buffer controller provided in the DDC 224 and temporarily stores data transmitted between the disks 200 and the host computer. The memory 228 connected to the microcontroller 210 is composed of a ROM for storing the control program according to the present invention and a RAM for storing data generated during controlling the drive.

Figure 3:
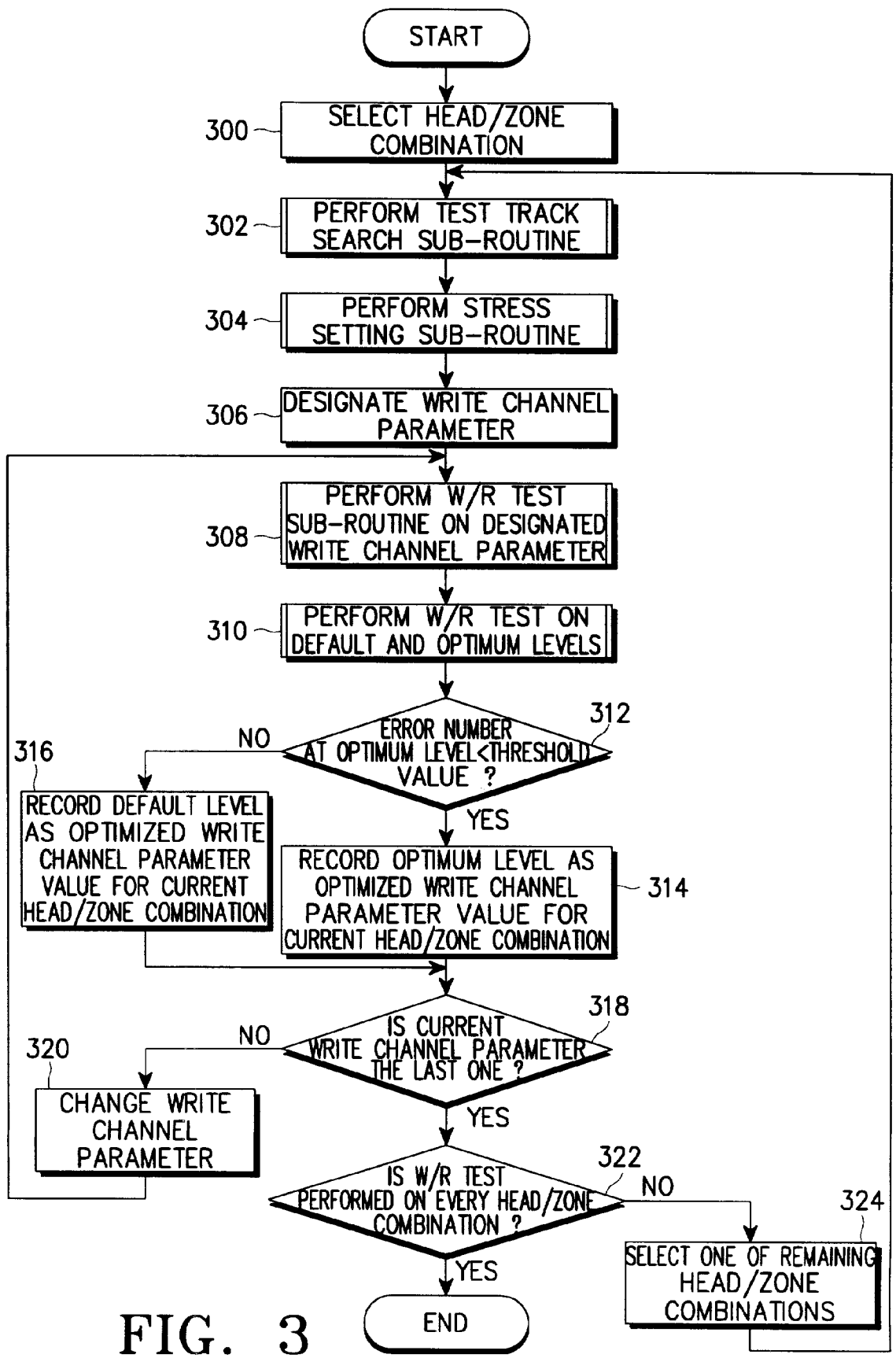
FIG. 3 is a flowchart of write channel parameter optimization according to an embodiment of the present invention.
Figure 4:
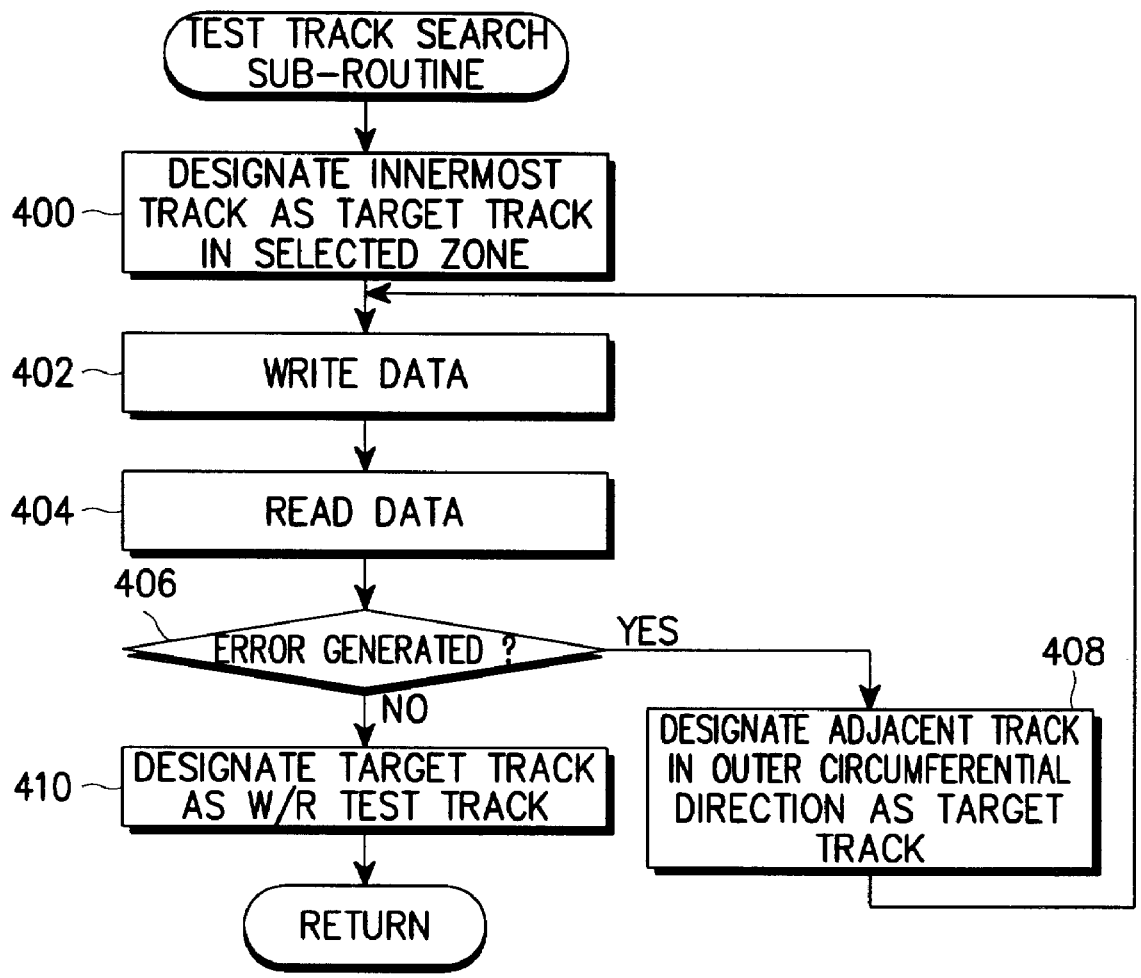
FIG. 4 is a flowchart of implementing a test track search sub-routine shown in FIG. 3.
Figure 5:
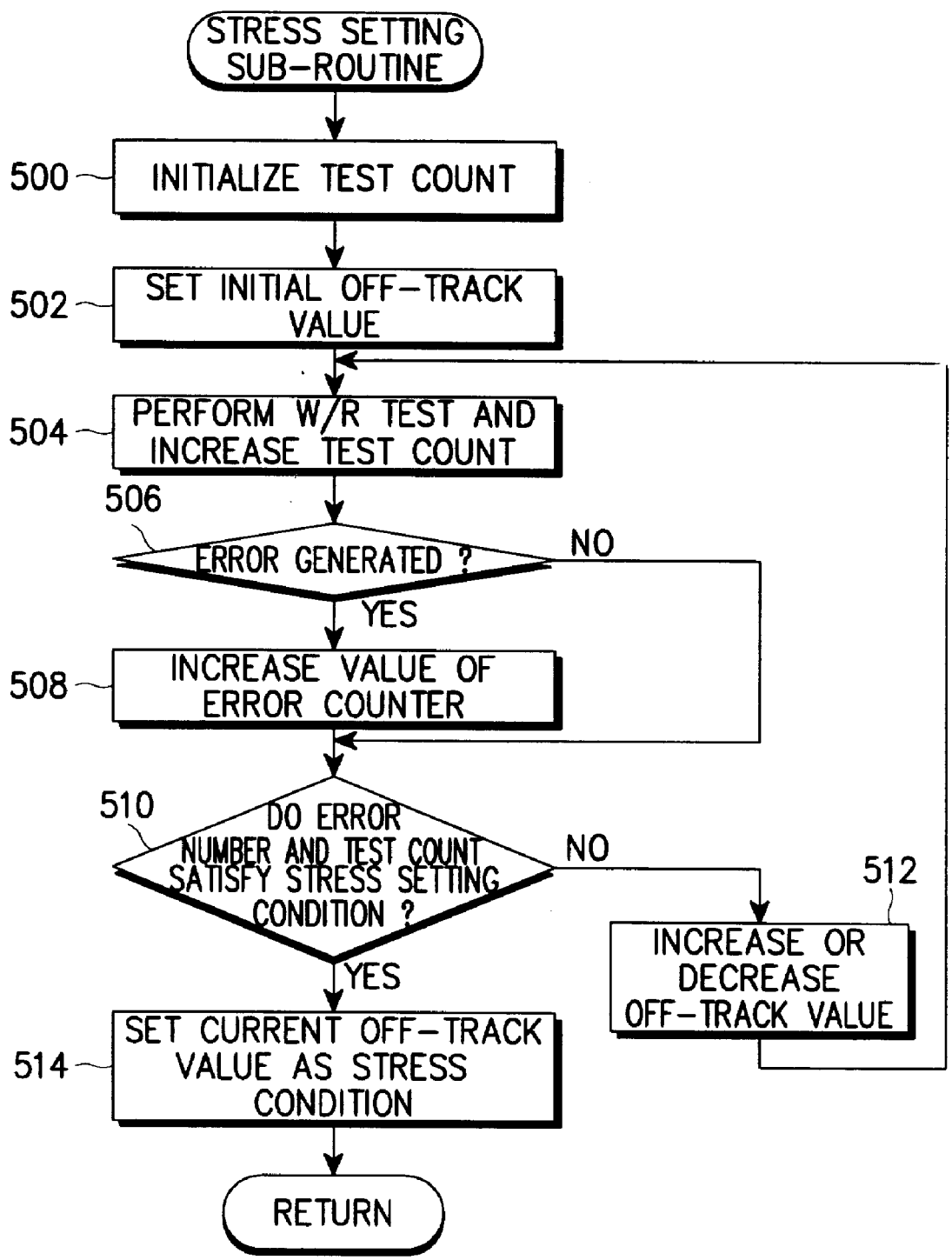
FIG. 5 is a flowchart of implementing a stress setting sub-routine shown in FIG. 3.
Figure 6:
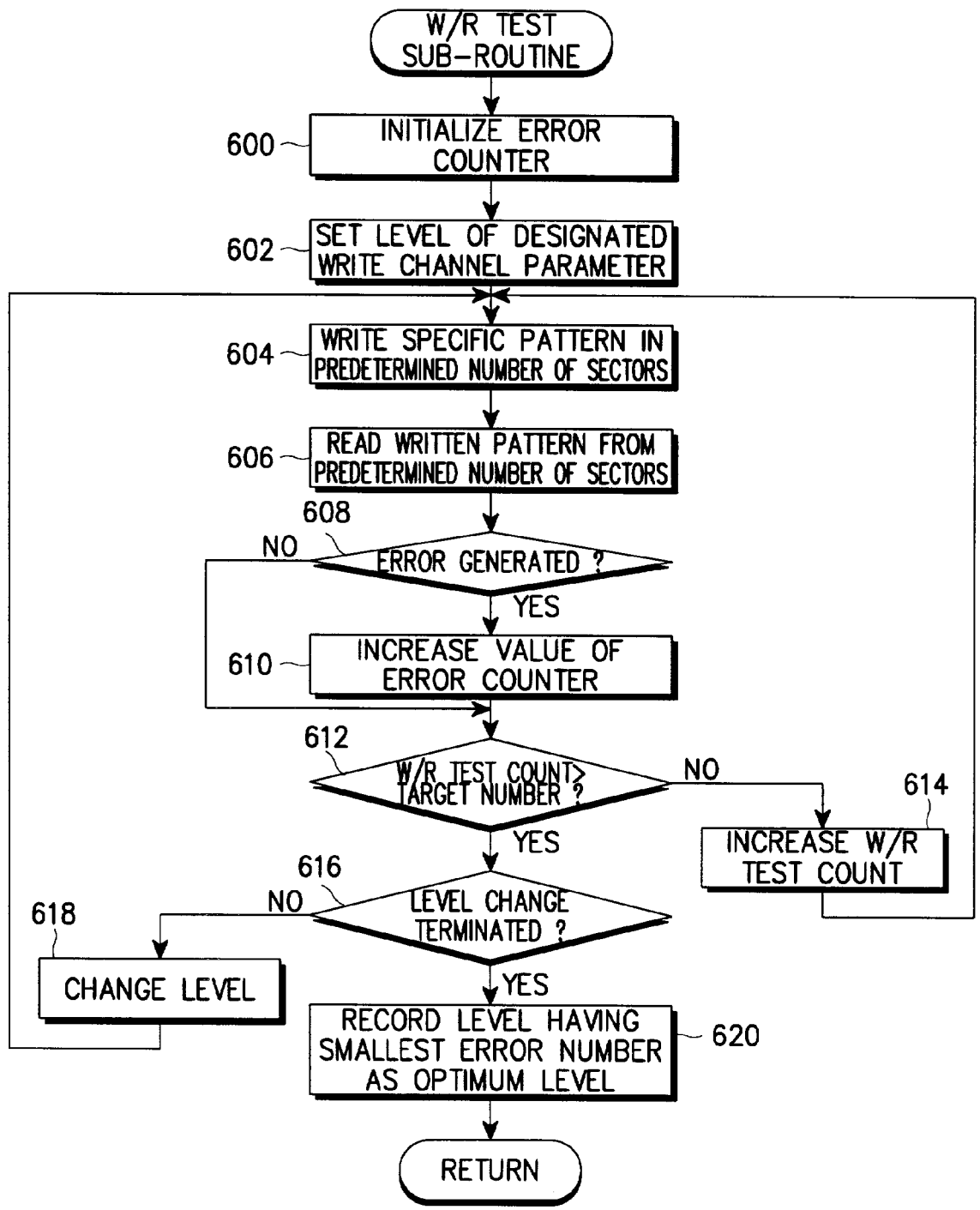
FIG. 6 is a flowchart of implementing a write/read test sub-routine shown in FIG. 3.

FIG. 3 is a flowchart of controlling write channel parameter optimization according to an embodiment of the present invention. FIGS. 4, 5, and 6 are flowcharts of implementing a test track search sub-routine, a stress setting sub-routine, and a write/read (W/R) test sub-routine shown in FIG. 3, respectively.

A detailed description of the write channel parameter optimization method will hereinbelow be given in connection with FIGS. 2 to 6. It is assumed in the embodiment of the present invention that the read/write channel parameter optimization method is implemented in a burn-in process for fabrication of a hard disk drive.

To optimize write channel parameters in an early stage of the burn-in process, the microcontroller 210 designates a head/zone combination in step 300. The head/zone combination refers to a combination of one of zones on a disk surface and a head 202 corresponding to the zone.

Therefore, the number of head/zone combinations is the product of the number of zones on each disk surface and the number of heads in the embodiment of the present invention having two disks 200.

In step 302, the microcontroller 210 performs a test track search sub-routine. A test track is one selected from a plurality of tracks in the designated zone to perform a write channel parameter optimization test.

For the test track search sub-routine which shall be seen below referring to FIG. 4, the microcontroller 210 designates the innermost track in the designated zone as a target track, in step 400. After the microcontroller 210 writes a specific pattern on the target track in step 402, it reads the data in step 404. The microcontroller 210 determines whether a data read error is generated during the data read, in step 406. In the absence of a data read error, the microcontroller 210 designates the target track as a W/R test track in step 410 and then returns to a main routine, that is, the write channel parameter optimization routine of FIG. 3. On the other hand, if a data read error is found in step 406, the microcontroller 210 designates a track adjacent to the target track set in step 400 in an outer circumferential direction as a new target track in step 408, and then repeats the above data write/read procedure. That is, the microcontroller 210 searches for a track free of a data read error in the zone designated in step 300 and sets the track as a representative of the corresponding zone.

Following the designation of the track as a W/R test track in the test track search sub-routine, the microcontroller 210 returns to step 304 of FIG. 3 to implement the stress setting sub-routine. The stress setting sub-routine is a procedure of setting off-track stress conditions for use in a W/R test in order to finish a test in a short time with appropriate stresses. Referring to FIG. 5, the stress setting sub-routine will be described. In step 500, the microcontroller 210 initializes a test count to zero. The microcontroller 210 sets an initial off-track value in step 502, and performs a data W/R test and increases the test count by one. The W/R test in step 504 is a general one in which a predetermined user pattern is written on a test track and then read. If an error is generated during the data W/R test in step 506, the microcontroller 210 increases the value of an error counter in step 508. Otherwise, the microcontroller 210 determines whether the number of errors and the test count satisfy a stress setting condition, in step 510. The stress setting condition is determined to check whether the error number is between predetermined maximum and minimum error values or the test count exceeds a predetermined maximum test count. That is, if the current error number is between the predetermined maximum and minimum error numbers or the test count exceeds the predetermined maximum test count, the microcontroller 210 sets a current off-track value as a stress condition in step 514, and then returns to the main routine of FIG. 3. On the contrary, if the error number is beyond the predetermined maximum error number, the microcontroller 210 decreases the current off-track value by one, in step 512. If the error number is below the predetermined minimum error value, the microcontroller 210 increases the current off-track value by one, in step 512, and then returns to step 504 to perform the W/R test.

Subsequently to setting an optimum stress condition in the stress setting sub-routine, the microcontroller 210 returns to step 306 of FIG. 3 to set a write channel parameter. Write channel parameters include write current and write precompensation, for example. The microcontroller 210 selects one of a plurality of write channel parameters in step 306, and performs a W/R test sub-routine on the selected write channel parameter in step 308.

Referring to FIG. 6, the W/R test sub-routine will be described. The microcontroller 210 initializes the error counter in step 600, and sets the level of the selected write channel parameter in step 602. In step 604, the microcontroller 210 writes a specific pattern in a predetermined number of sectors of the W/R test track designated in the test track search sub-routine. The microcontroller 210 reads the written pattern from the sectors in step 606. The microcontroller 210 determines whether a read error is generated during the data read, in step 608. In the absence of a read error, the procedure jumps to step 612 and, otherwise, the microcontroller 210 increases the value of the error countering step 610 and then goes to step 612. Instep 612, the microcontroller 210 determines whether a W/R test count exceeds a predetermined target number. If the W/R test count is not larger than the target number, the microcontroller 210 increases the test count in step 614 and performs steps 604 to 612 again. If the W/R test count exceeds the target number, the microcontroller 210 determines whether the level of the designated write channel parameter cannot be varied any longer, in step 616. If the level of the write channel parameter can be varied, the microcontroller 210 changes the level in step 618, and performs a W/R test with respect to all levels of the designated write channel parameter by repeating steps 604 to 616. Following implementation of an equal number of write and read tests in this manner, the microcontroller 210 sets the level of the write channel parameter having the smallest error number as an optimum level and records the optimum level in the maintenance area of the disk surface in step 620, and then returns to the main routine for optimization of write channel parameters.

In step 310, the microcontroller 210 performs W/R tests on a default level and the optimum level of the write channel parameter obtained from the W/R test sub-routine. The W/R tests on the default level and the optimum level can be simply implemented as follows. First, a W/R test is performed on the default level of the write channel parameter selected in step 306. Here, the number of W/R tests is twice the target number of step 612 in FIG. 6 to more accurately compare error numbers at the default level and the optimum level. That is, the microcontroller 210 calculates the error numbers by repeating the W/R test on the default level and then on the optimum level. Then, the microcontroller 210 determines whether the error number at the optimum level is smaller than a threshold value, in step 312. The threshold value for the optimum level error number is set to 80% of the error number at the default level. If the error number at the optimum level is smaller than the threshold value, the microcontroller 210 records the optimum level as an optimized write channel parameter value for the current head/zone combination in the maintenance area, in step 314. On the other hand, if the error number at the optimum level is not smaller than the threshold value, the microcontroller 210 records the default level as the optimized write channel parameter value for the current head/zone combination in the maintenance area, in step 316. In step 318, the microcontroller 210 determines whether the current write channel parameter is the last one. If it is not the last write channel parameter, the microcontroller 210 selects another write channel parameter in step 320 and then performs steps 308 to 318. In this manner, each write channel parameter can be optimized for a head/zone combination. Meanwhile, the microcontroller 210 determines whether the W/R test sub-routine is performed on every head/zone combination, in step 322. If it is not, the microcontroller 210 selects one of the remaining head/zone combinations in step 324 and returns to step 302. The microcontroller 210 repeats steps 302 to 322 to thereby optimize write channel parameters for all the head/zone combinations.

To sum up the above write channel parameter optimization, (1) one of head/zone combinations is selected. (2) A track in the selected zone is designated as a test track. (3) A specific data pattern is written and read on and from the test track, while varying the level of each write channel parameter related with a read/write channel circuit. Here, the number of data writes is equal to that of data reads in searching an optimum level for the selected write channel parameter. (4) W/R tests are performed on an default level and an optimum level for each write channel parameter. If the error number at the optimum level is below a predetermined threshold value, the optimum level of the write channel parameter is set as the level of the optimized write channel parameter. In this procedure, the levels of write channel parameters are optimized, thereby increasing the performance and reliability of the drive.

Figure 7:
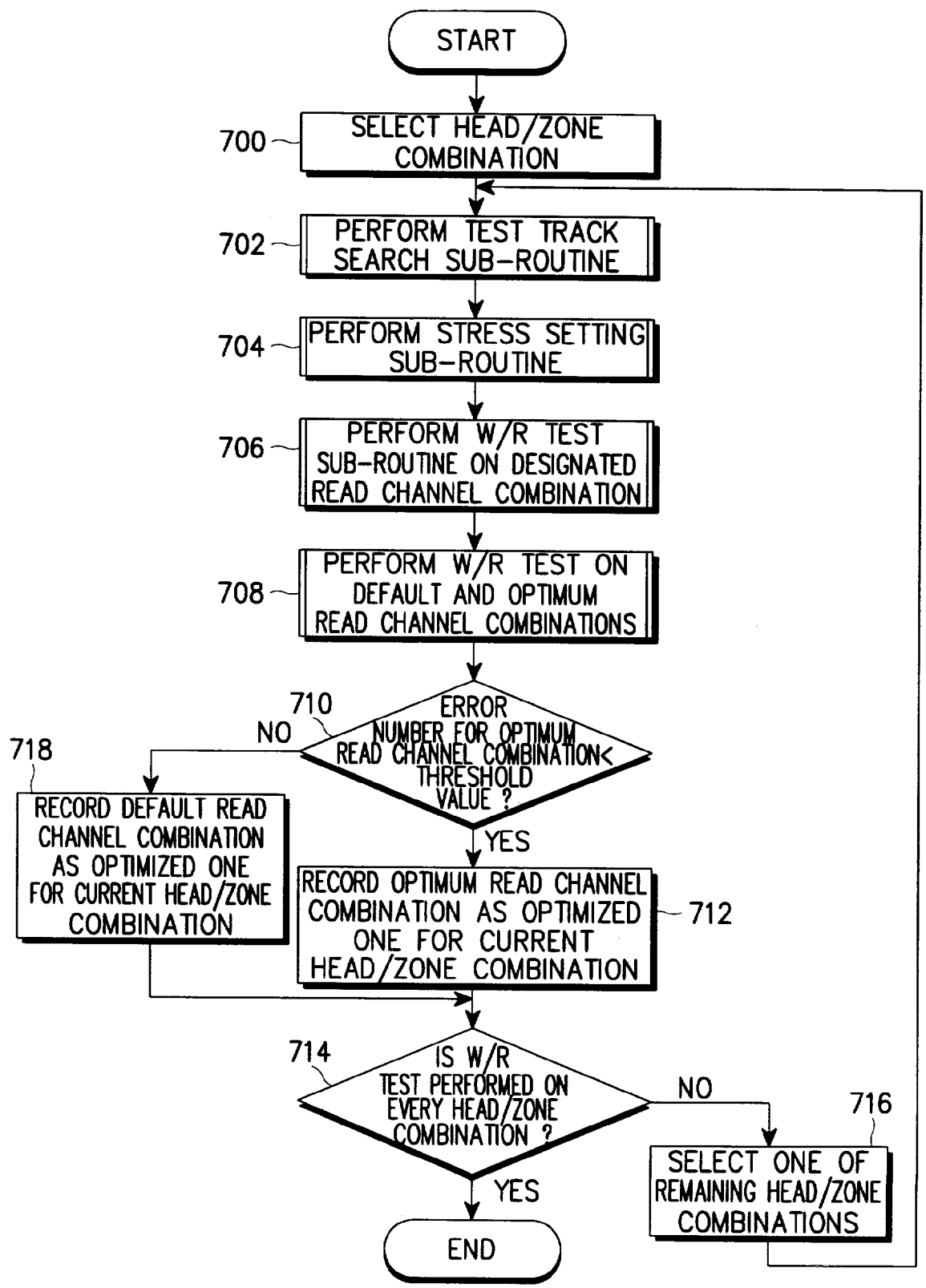
FIG. 7 is a flowchart of read channel parameter optimization according to another embodiment of the present invention.
Figure 8:
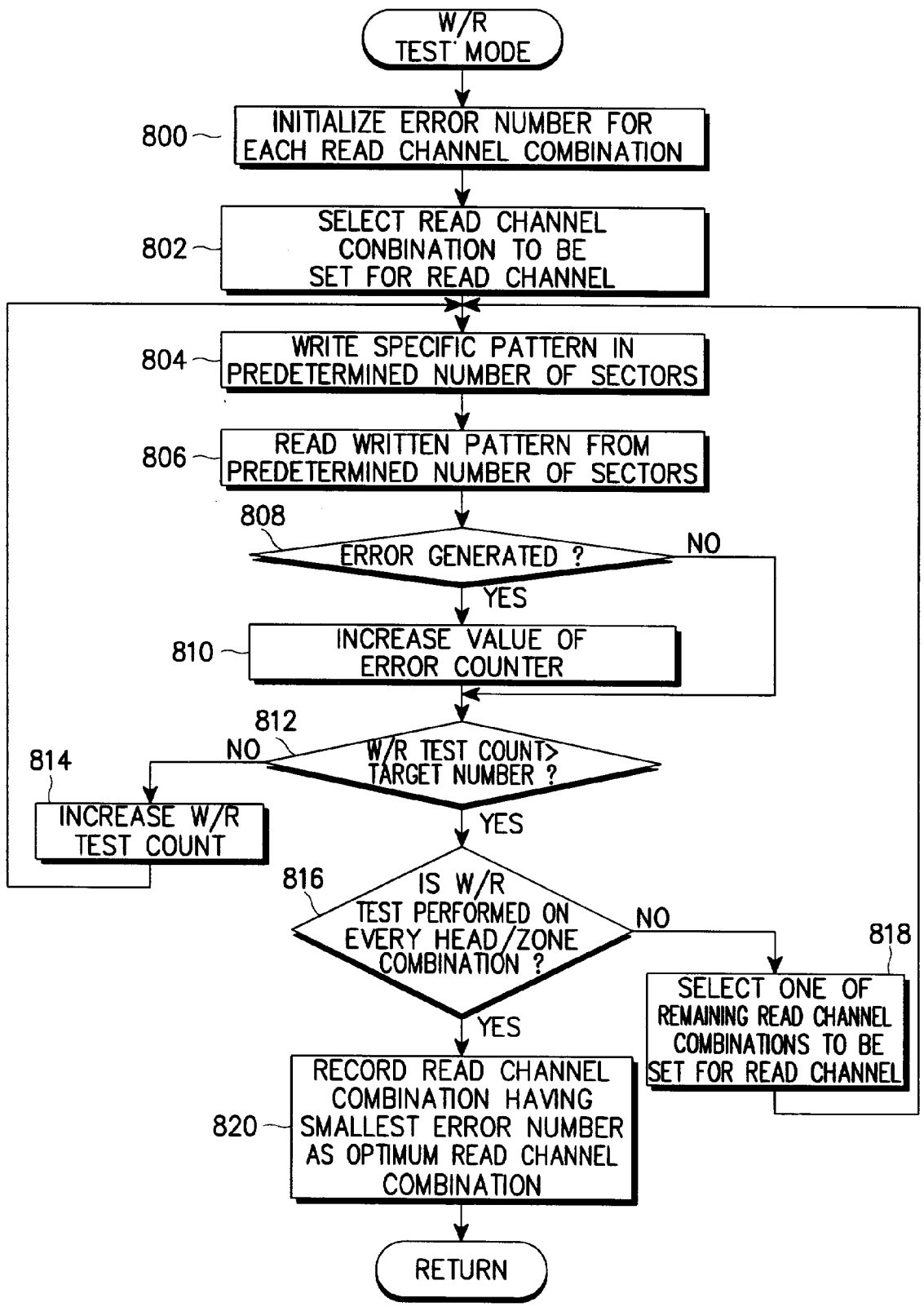
FIG. 8 is a flowchart of implementing a write/read test sub-routine on a read channel parameter combination, shown in FIG. 7.

Now, a detailed description of read channel optimization will be given below. FIG. 7 is a flowchart of controlling the read channel parameter optimization according to another embodiment of the present invention, and FIG. 8 is a flowchart of implementing a W/R test sub-routine on a read channel combination. Since the read channel parameter optimization is similar to the write channel parameter optimization in the embodiment of the present invention, the description of a procedure of the read channel parameter optimization has been omitted if it was deemed to be the same as that of the write channel parameter optimization.

Referring to FIGS. 7 and 8, the read channel parameter optimization in an early stage of the burn-in process will be described as follows. The microcontroller 210 designates a head/zone combination in step 700, and performs the test track search sub-routine of FIG. 4 in step 702. After a track is set as the W/R test track in the test track search sub-routine, the microcontroller 210 returns to step 704 of FIG. 7 to implement the stress setting sub-routine. Then, the microcontroller 210 returns to step 706 of FIG. 7 to perform a W/R test sub-routine on a read channel combination.

The W/R test sub-routine for the read channel combination will be described with reference to FIG. 8. The microcontroller 210 initializes the error counter for each read channel combination in step 800, and selects a read channel combination and sets it in a read channel in step 802. Then, the microcontroller 210 writes a specific pattern in a predetermined number of sectors of the test track in step 804, and reads the written pattern from the sectors in step 806. In this case, noise-induced errors can be reduced because of performing one data read per one data write. Even possible generation of noise has a negligible influence on the result of the W/R tests. Then, the microcontroller 210 determines whether a data read error is generated, in step 808. In the presence of a read error, the microcontroller 210 increases the value of the error counter in step 810 and, otherwise, the procedure jumps to step 812. In step 812, the microcontroller 210 determines whether a W/R test count of the selected read channel combination exceeds a predetermined target number. If the W/R test count is not larger than the target number, the microcontroller 210 increases the test count by one in step 814 and repeats steps 804 to 812. On the contrary, if the test count exceeds the target number, the microcontroller 210 determines whether W/R tests are completely performed on all the read channel combinations, in step 816. If the W/R tests are not completed for every read channel combination, the microcontroller 210 selects one of the remaining read channel combinations and set it in the read channel in step 818, and then returns to step 804. The microcontroller 210 performs the W/R test sub-routine on all the read channel combinations and calculates error numbers, in this manner. If it is determined that the W/R test sub-routine has been performed on all the read channel combinations in step 816, the microcontroller 210 records a read channel combination having the smallest error number as an optimum channel combination in the maintenance area, in step 820, and returns to the main routine of FIG. 7.

Following the W/R test sub-routine, the microcontroller 210 performs W/R tests on a default read channel combination and the optimum read channel combination, in step 708. The W/R tests on the default and optimum read channel combinations can be simply implemented as follows. First, a W/R test is performed on the default read channel combination. Here, the W/R test count is twice the target number of step 812 in FIG. 8 to more accurately compare error numbers of the default read channel combination and the optimum read channel combination. Thus, the microcontroller 210 calculates the error numbers by repeating the W/R test on the default read channel combination and then on the optimum read channel combination. Then, the microcontroller 210 determines whether the error number of the optimum read channel combination is smaller than a threshold value, in step 710. The threshold value for the error number of the optimum read channel combination is set to 80% of that of the default read channel combination. If the error number of the optimum read channel combination is smaller than the threshold value, the microcontroller 210 records the optimum read channel combination as an optimized read channel combination for the current head/zone combination in the maintenance area, in step 712. On the other hand, if the error number is smaller than a of the optimum read channel combination is smaller than a threshold value threshold value than the threshold value, the microcontroller 210 records the default read channel combination as the optimized read channel combination for the current head/zone combination in the maintenance area, in step 718. In this manner, a read channel combination can be optimized for a head/zone combination. Meanwhile, the microcontroller 210 determines whether the W/R test sub-routine is performed on every head/zone combination, in step 714. If it is not, the microcontroller 210 selects one of the remaining head/zone combinations in step 716 and returns to step 702. The microcontroller 210 repeats steps 702 to 718 to thereby optimize read channel parameters for all the head/zone combinations.

To sum up the above read channel parameter optimization, (1) one of head/zone combinations is selected and a track in the selected zone is designated as a test track. (2) Data writes and reads of the same number are repeated with respect to each sequentially selected read channel combination and the number of read errors is calculated, to thereby search for an optimum read channel combination.

(3) W/R tests are performed on a default read channel combination and the searched optimum read channel combination and the optimum read channel combination is recorded as an optimized read channel combination for the head/zone combination if an error number of the optimum read channel combination is below a threshold value set with respect to that of the default read channel combination. In this manner, read channel parameters can be optimized in accordance with characteristics of all head/zone combinations.

The thus-optimized write and read channel parameter values recorded in the maintenance area are read when power is on in a user mode, thereby reducing an error rate during a data write/read and thus increasing drive performance.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A write channel parameter optimization method in a hard disk drive having a read/write channel circuit, comprising the steps of:

designating a track as a test track in a selected one of a plurality of head/zone combinations, each head/zone combination including a zone on a disk surface and head of the hard disk drive corresponding to the zone;

searching for an optimum level of a write channel parameter by writing a data pattern in the designated test track of a selected head/zone combination at each of a plurality of levels of the write channel parameter, and reading the data pattern written at each level of the plurality of levels of the write channel parameter to determine the optimum level of the write channel parameter; and performing write tests and read tests on the optimum level and on a default level of the write channel parameter to determine an optimized write channel parameter value, and recording one of the default level and the optimum level of the write channel parameter as the optimized write channel parameter value for the selected head/zone combination.

2. The write channel parameter optimization method of claim 1, further comprising the step of setting a stress condition for use during the searching for an optimum level of a write channel parameter step.

3. The write channel parameter optimization method of claim 1, further comprised of the optimized write channel parameter value being recorded in a maintenance area of a corresponding disk surface.

4. The write channel parameter optimization method of claim 1, further comprised of the designated test track being free of data write errors and data read errors in a corresponding zone of the selected head/zone combination.

5. The write channel parameter optimization method of claim 1, further comprised of the step of performing write tests and read tests on the optimum level and on a default level of the write channel parameter further comprising the substeps of:

determining an error number for the optimum level and an error number for the default level of the write channel parameter by writing and reading a data pattern on and from the designated test track of the selected head/zone combination respectively with the optimum level and with the default level of the write channel parameter;

comparing the error number at the optimum level of the write channel parameter with a predetermined threshold value determined from the error number for the default level of the write channel parameter; and recording the optimum level of the write channel parameter as the optimized write channel parameter value for the selected head/zone combination upon the error number at the optimum level of the write channel parameter being smaller than the predetermined threshold value, and recording the default level of the write channel parameter as the optimized write channel parameter value for the selected head/zone combination upon the error number at the optimum level of the write channel parameter not being smaller than the predetermined threshold value.

6. A read channel parameter optimization method in a hard disk drive having a read/write channel circuit, comprising the steps of:

designating a track as a test track in a selected one of a plurality of head/zone combinations, each head/zone combination including a zone on a disk surface and a head of the hard disk drive corresponding to the zone;

searching for an optimum read channel parameter combination by determining an error number for each of a plurality of read channel parameter combinations from data pattern write and read operations on the designated test track of a selected head/zone combination for each of the plurality of read channel parameter combinations to determine the optimum read channel parameter combination; and performing write tests and read tests on the optimum read channel parameter combination and on a default read channel parameter combination to determine an optimized read channel parameter combination, and recording one of the default read channel parameter combination and the optimum read channel parameter combination as the optimized read channel parameter combination for the selected head/zone combination.

7. The read channel parameter optimization method of claim 6, further comprising the step of setting a stress condition for use during the searching for an optimum read channel parameter combination step.

8. The read channel parameter optimization method of claim 6, further comprised of the optimized read channel parameter combination being recorded in a maintenance area of a corresponding disk surface.

9. The read channel parameter optimization method of claim 6, further comprised of the designated test track being free of data write errors and data read errors in a corresponding zone of the selected head/zone combination.

10. The read channel parameter optimization method of claim 6, further comprised of the step of performing write tests and read tests on the optimum read channel parameter combination and on a default read channel parameter combination further comprising the substeps of:

determining an error number for the optimum read channel parameter combination and an error number for the default read channel parameter combination by writing and reading a data pattern on and from the designated test track of the selected head/zone combination respectively for the optimum read channel parameter combination and for the default read channel parameter combination;

comparing the error number for the optimum read channel parameter combination with a predetermined threshold value determined from the error number for the default read channel parameter combination; and recording the optimum read channel parameter combination as the optimized read channel parameter combination for the selected head/zone combination upon the error number for the optimum read channel parameter combination being smaller than the predetermined threshold value, and recording the default read channel parameter combination as the optimized read channel parameter combination for the selected head/zone combination upon the error number for the optimum read channel parameter combination not being smaller than the predetermined threshold value.

11. A read/write channel parameter optimization method in a hard disk drive having a read/write channel circuit, comprising the steps of:

designating a track as a test track in a selected one of a plurality of head/zone combinations, each head/zone combination including a zone on a disk surface and a head of the hard disk drive corresponding to the zone;

searching for an optimum level of a write channel parameter by performing data write operations and read operations on the designated test track of a selected head/zone combination to determine the optimum level of the write channel parameter, and recording one of a default level and the optimum level of the write channel parameter as an optimized write channel parameter value for the selected head/zone combination; and searching for an optimum read channel parameter combination by determining an error number for each of a plurality of read channel parameter combinations from data pattern write and read operations on designated test track of the selected head/zone combination to determine the optimum read channel parameter combination, and recording one of the optimum read channel parameter combination and a default read channel parameter combination as an optimized read channel parameter combination for the selected head/zone combination.

12. A write channel parameter optimization device in a hard disk drive having a read/write channel circuit, the device comprising:

a means for designating a track as a test track in a selected one of a plurality of head/zone combinations, each head/zone combination including a zone on a disk surface and a head of the hard disk drive corresponding to the zone;

a means for searching for an optimum level of a write channel parameter by writing a data pattern in the designated test track for a selected head/zone combination, at each of a plurality of levels of the write channel parameter, and for reading the data pattern written at each level of the plurality of levels of the write channel parameter to determine the optimum level of the write channel parameter; and a means for performing write tests and read tests on the optimum level and on a default level of the write channel parameter to determine an optimized write channel parameter value, and for recording one of the default level and the optimum level of the write channel parameter as the optimized write channel parameter value for the selected head/zone combination.

13. The write channel parameter optimization device of claim 12, further comprising a means for setting a stress condition for use during writing data pattern and reading the data pattern written by the means for searching and reading.

14. The write channel parameter optimization device of claim 12, further comprised of the optimized write channel parameter value being recorded in a maintenance area of corresponding disk surface by the means for performing and recording.

15. The write channel parameter optimization device of claim 12, further comprised of the designated test track designated by the means for designating a test track being free of data write errors and data read errors in a corresponding zone of the selected head/zone combination.

16. The write channel parameter optimization device of claim 12, further comprised of the means for performing and recording further comprising:

a means for determining an error number for the optimum level and an error number for the default level of the write channel parameter by writing and reading a data pattern on and from the designated test track of the selected head/zone combination respectively with the optimum level and with the default level of the write channel parameter;

a means for comparing the error number at the optimum level of the write channel parameter with a predetermined threshold value determined from the error number for the default level of the write channel parameter; and a means for recording the optimum level of the write channel parameter as the optimized write channel parameter value for the selected head/zone combination upon the error number at the optimum level of the write channel parameter being smaller than the predetermined threshold value, and recording the default level of the write channel parameter as the optimized write channel parameter value for the selected head/zone combination upon the error number at the optimum level of the write channel parameter not being smaller than the predetermined threshold value.

17. A read channel parameter optimization device in a hard disk drive having a read/write channel circuit, the device comprising:

a means for designating a track as a test track in a selected one of a plurality of head/zone combinations, each head/zone combination including a zone on a disk surface and a head of the hard disk drive corresponding to the zone;

a means for searching for an optimum read channel parameter combination by determining an error number for each of a plurality of read channel parameter combinations from data pattern write and read operations on the designated test track of a selected head/zone combination for each of the plurality of read channel parameter combinations to determine the optimum read channel parameter combination; and a means for performing tests and read tests on the optimum read channel parameter combination and on a default read channel parameter combination to determine an optimized read channel parameter combination, and for recording one of the default read channel parameter combination and the optimum read channel parameter combination as the optimized read channel parameter combination for the selected head/zone combination.

18. The read channel parameter optimization device of claim 17, further comprising a means for setting a stress condition for use during the data pattern write and read operations by the means for searching.

19. The read channel parameter optimization device of claim 17, further comprised of the optimized read channel parameter combination being recorded in a maintenance area of a corresponding disk surface by the means for performing and recording.

20. The read channel parameter optimization device of claim 17, further comprised of the designated test track designated by the means for designating a test track being free of data write errors and data read errors in a corresponding zone of the selected head/zone combination.

21. The read channel parameter optimization device of claim 17, further comprised of the means for performing and recording further comprising:

a means for determining an error number for the optimum read channel parameter combination and an error number for the default read channel parameter combination by writing and reading a data pattern on and from the designated test track of the selected head/zone combination respectively for the optimum read channel parameter combination and for the default read channel parameter combination;

a means for comparing the error number for the optimum read channel parameter combination with a predetermined threshold value determined from the error number for the default to read channel parameter combination; and a means for recording the optimum read channel parameter combination as the optimized read channel parameter combination for the selected head/zone combination upon the error number for the optimum read channel parameter combination being smaller than the predetermined threshold value, and for recording the default read channel parameter combination as the optimized read channel parameter combination for the selected head/zone combination upon the error number for the optimum read channel parameter combination not being smaller than the predetermined threshold value.

22. A read/write channel parameter optimization device in a hard disk drive having a read/write channel circuit, the device comprising:

a means for designating a track as a test track in a selected one of a plurality of head/zone combinations each head/zone combination including a zone on a disk surface and a head of the hard disk drive corresponding to the zone;

a means for searching for an optimum level of a write channel parameter by performing data pattern write and read operations on the designated test track of a selected head/zone combination to determine the optimum level of the write channel parameter, and for recording one of a default level and the optimum level of the write channel parameter as an optimized write channel parameter value for the selected head/zone combination; and a means for searching for an optimum read channel parameter combination by determining an error number for each of a plurality of read channel parameter combinations from data pattern write and read operations on the designated test track of the selected head/zone combination to determine the optimum read channel parameter combination, and for recording one of the optimum read channel parameter combination and a default read channel parameter combination as an optimized read channel parameter combination for the selected head/zone combination.

* * * * *